(12) United States Patent
Movert et al.

(10) Patent No.: US 10,696,298 B2
(45) Date of Patent: *Jun. 30, 2020

(54) PATH PREDICTION FOR A VEHICLE

(71) Applicant: Volvo Car Corporation, Göteborg (SE)

(72) Inventors: Anders Movert, Göteborg (SE); Nasser Mohammadiha, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/213,106

(22) Filed: Dec. 7, 2018

(65) Prior Publication Data

US 2019/0176818 A1 Jun. 13, 2019

(30) Foreign Application Priority Data

Dec. 11, 2017 (EP) .................................. 17206445

(51) Int. Cl.
*B60W 30/09* (2012.01)
*B60W 50/00* (2006.01)
(Continued)

(52) U.S. Cl.
CPC .......... *B60W 30/09* (2013.01); *B60W 30/095* (2013.01); *B60W 30/0953* (2013.01);
(Continued)

(58) Field of Classification Search
CPC ..... B60W 2050/0089; B60W 2420/42; B60W 2420/52; B60W 2520/10; B60W 2520/14;
(Continued)

(56) References Cited

U.S. PATENT DOCUMENTS

| 8,494,716 B1 * | 7/2013 | Lee ...................... G05D 1/0246 |
| | | 382/103 |
| 9,031,758 B1 * | 5/2015 | Goudy .............. B60W 50/0098 |
| | | 701/70 |

(Continued)

FOREIGN PATENT DOCUMENTS

| EP | 3219564 A1 * | 9/2017 | ............. G01C 21/26 |
| EP | 3219564 A1 | 9/2017 | |

(Continued)

OTHER PUBLICATIONS

Oct. 26, 2018 European Search Report issue on International Application No. EP17206445.

*Primary Examiner* — Babar Sarwar
(74) *Attorney, Agent, or Firm* — Clements Bernard Walker; Christopher L. Bernard

(57) ABSTRACT

A method and a system for predicting a near future path and an associated output control signal for a vehicle. Prediction sensor data, vehicle driving data, and road data are collected. An input control signal indicative of an intended driving action is received. The sensor data and the vehicle driving data are pre-processed to provide a set of object data comprising a time series of previous positions of a respective object relative the vehicle, a time series of the previous headings of the object, and a time series of previous velocities of the object. The object data, the road data, the vehicle driving data, the control signal, and the sensor data are processed in a deep neural network. Based on the processing in the deep neural network, a predicted path output and an output control signal are provided.

14 Claims, 10 Drawing Sheets

(51) Int. Cl.
- *G06N 3/08* (2006.01)
- *G06N 3/04* (2006.01)
- *B60W 30/095* (2012.01)
- *F02D 41/14* (2006.01)
- *B60W 30/10* (2006.01)
- *G06F 16/29* (2019.01)

(52) U.S. Cl.
CPC ........ *B60W 30/0956* (2013.01); *B60W 30/10* (2013.01); *B60W 50/0097* (2013.01); *F02D 41/1405* (2013.01); *G06F 16/29* (2019.01); *G06N 3/04* (2013.01); *G06N 3/0445* (2013.01); *G06N 3/0454* (2013.01); *G06N 3/08* (2013.01); *G06N 3/084* (2013.01); *G06N 3/088* (2013.01); *B60W 2050/0089* (2013.01); *B60W 2420/42* (2013.01); *B60W 2420/52* (2013.01); *B60W 2520/10* (2013.01); *B60W 2520/14* (2013.01); *B60W 2552/00* (2020.02); *B60W 2554/00* (2020.02); *B60W 2900/00* (2013.01); *F02D 2200/701* (2013.01); *F02D 2200/702* (2013.01)

(58) Field of Classification Search
CPC ......... B60W 2550/10; B60W 2550/14; B60W 2900/00; B60W 30/09; B60W 30/095; B60W 30/0953; B60W 30/0956; B60W 30/10; B60W 50/0097; F02D 2200/701; F02D 2200/702; F02D 41/1405; G06F 16/29; G06N 3/04; G06N 3/0445; G06N 3/0454; G06N 3/08; G06N 3/084; G06N 3/088

See application file for complete search history.

(56) References Cited

U.S. PATENT DOCUMENTS

| | | | | |
|---|---|---|---|---|
| 9,205,835 B2* | 12/2015 | Stein | .................. | B60T 7/12 |
| 10,001,381 B2* | 6/2018 | Akaho | ............... | G01C 21/3655 |
| 10,623,661 B2* | 4/2020 | Oh | ......................... | G06T 5/002 |
| 2009/0195414 A1* | 8/2009 | Riegel | ................ | G01C 21/3697 340/995.19 |
| 2009/0201140 A1* | 8/2009 | Fargas | ................ | B60W 40/101 340/441 |
| 2010/0097457 A1* | 4/2010 | Zhang | ................ | G06K 9/00798 348/119 |
| 2010/0114431 A1* | 5/2010 | Switkes | .............. | B60T 8/17557 701/41 |
| 2011/0187863 A1* | 8/2011 | Glander | ............. | G06K 9/00805 348/148 |
| 2012/0316730 A1* | 12/2012 | Zhang | .................. | B60W 40/06 701/41 |
| 2014/0156126 A1* | 6/2014 | Tran | ...................... | G01F 23/242 701/22 |
| 2014/0160244 A1* | 6/2014 | Berberian | .......... | G06K 9/00805 348/46 |
| 2015/0166072 A1* | 6/2015 | Powers | ................ | G08G 1/0129 701/1 |
| 2015/0248132 A1* | 9/2015 | Lee | ........................ | B60W 30/10 701/23 |
| 2015/0254982 A1* | 9/2015 | Goudy | .................. | G08G 1/163 340/435 |
| 2015/0353095 A1* | 12/2015 | Freess | ...................... | B60C 9/00 701/41 |
| 2015/0371095 A1* | 12/2015 | Hartmann | .......... | G06K 9/00476 348/148 |
| 2016/0046170 A1* | 2/2016 | Lu | ....................... | B60T 8/17551 701/48 |
| 2016/0046290 A1* | 2/2016 | Aharony | ............... | B60W 10/04 701/41 |
| 2016/0121902 A1* | 5/2016 | Huntzicker | ......... | B60W 40/068 701/41 |
| 2016/0325753 A1* | 11/2016 | Stein | ......................... | G06K 9/46 |
| 2017/0225680 A1* | 8/2017 | Huang | ...................... | B60T 7/22 |
| 2017/0267177 A1* | 9/2017 | Nariyambut Murali | | G06K 9/4628 |
| 2018/0265085 A1* | 9/2018 | Mallinger | ............. | B60W 30/16 |
| 2020/0026720 A1* | 1/2020 | Liu | ..................... | G06F 16/2264 |

FOREIGN PATENT DOCUMENTS

| | | |
|---|---|---|
| WO | 2016156236 A1 | 10/2016 |
| WO | 2016183074 A1 | 11/2016 |
| WO | WO-2016183074 A1 * | 11/2016 ......... B60G 17/0182 |

* cited by examiner

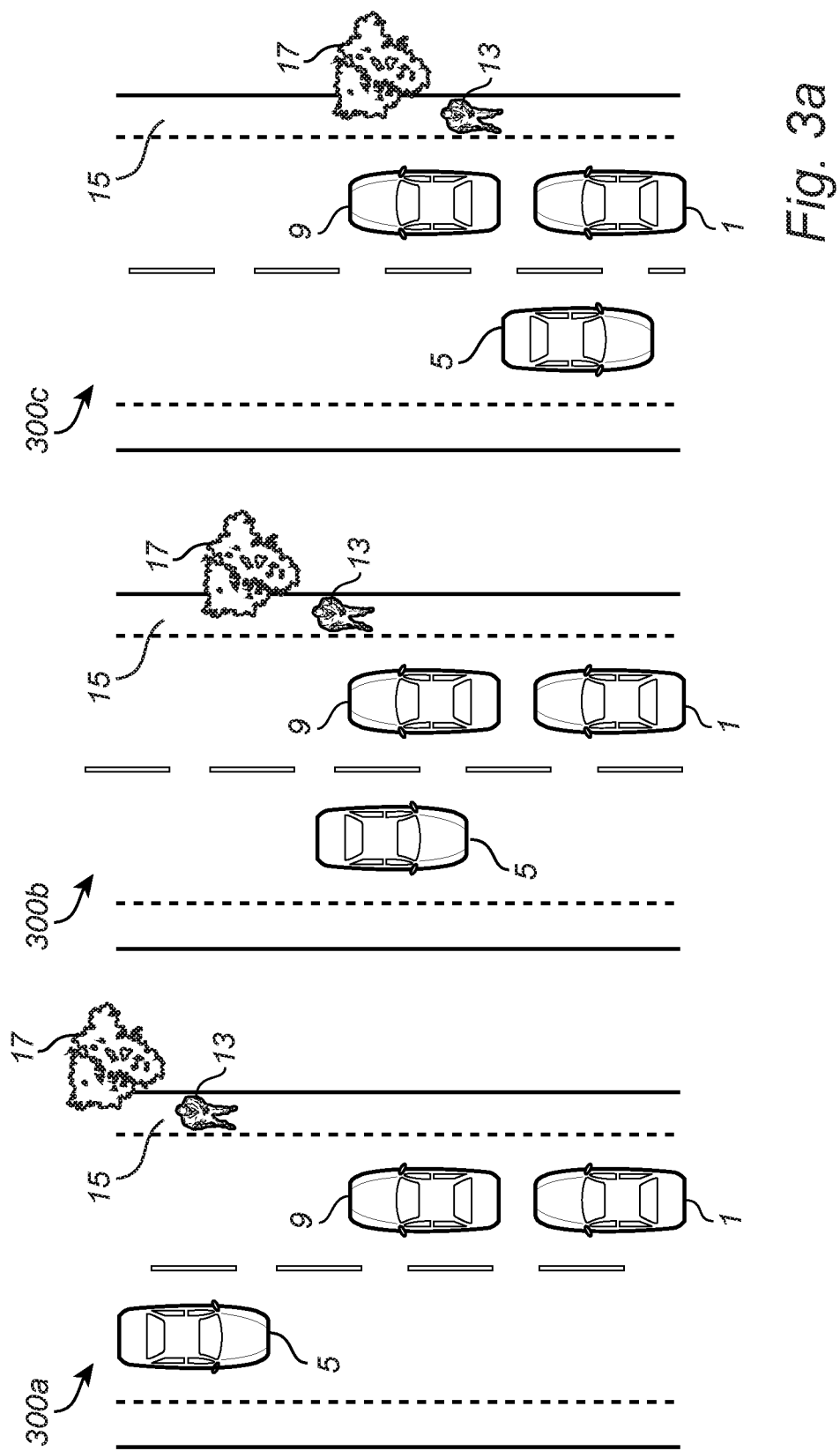

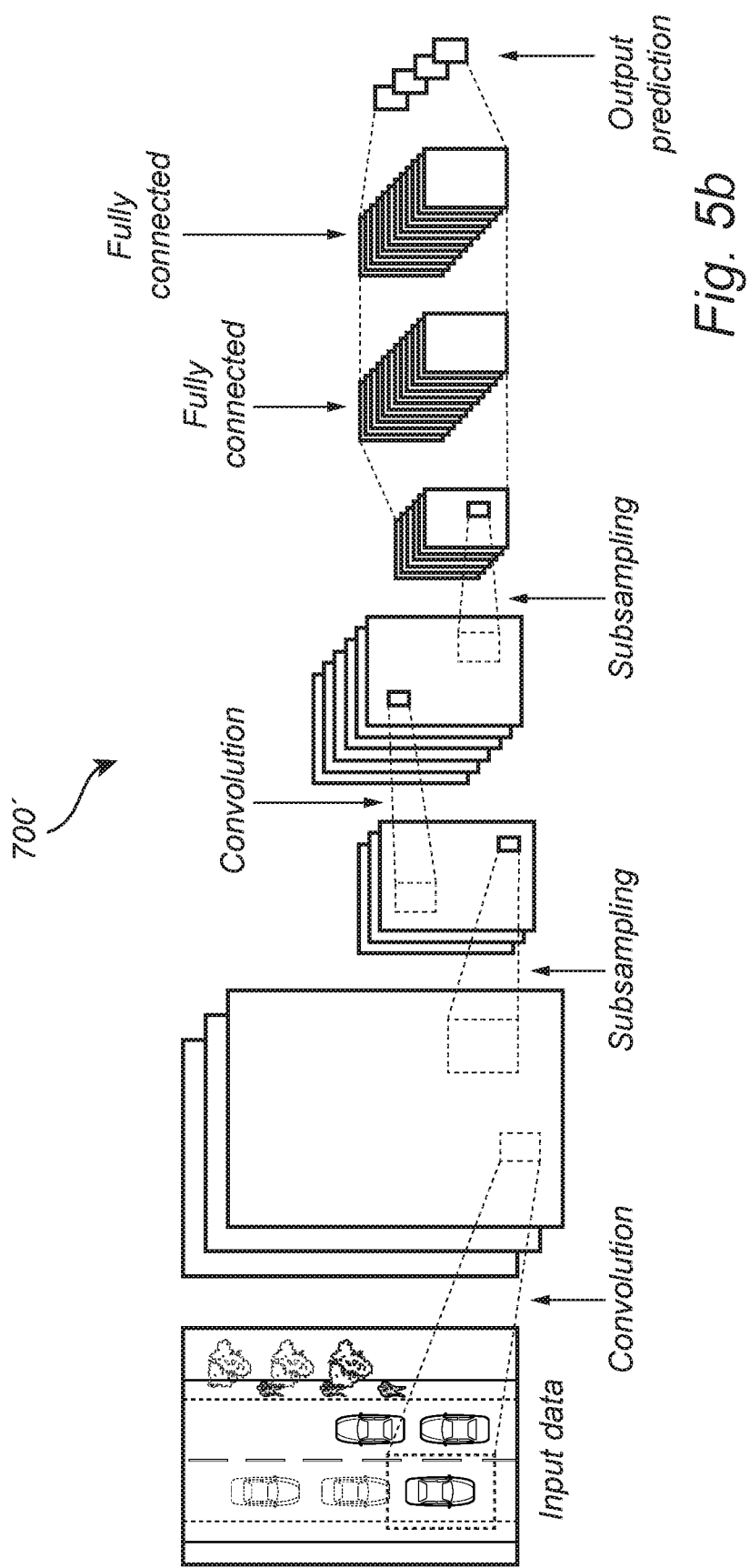

PATH PREDICTION FOR A VEHICLE

CROSS-REFERENCE TO RELATED APPLICATION

The present patent application/patent claims the benefit of priority of co-pending European Patent Application No. 17206445.3, filed on Dec. 11, 2017, and entitled "PATH PREDICTION FOR A VEHICLE," the contents of which are incorporated in full by reference herein.

FIELD OF THE INVENTION

The present invention relates to a system and a method for predicting the near future path for a vehicle to thereby provide an associated output control signal. The present invention also relates to a vehicle comprising such a system.

BACKGROUND OF THE INVENTION

Advanced driver assist systems (ADAS) in vehicles range from cruise control and adaptive lighting to more advanced systems such as automatic braking, automatic steering to keep the vehicle in the right lane, or alerting the driver of the presence of other cars, etc. Generally, ADAS retrieve input data from multiple sources such as image processing from cameras, radar, or LiDAR. More recently, vehicle-to-vehicle connectivity is arising as a promising addition to present ADAS.

Path prediction is an important component for advanced driver assistance systems for proving the vehicle with a safe and natural behavior in the traffic. Path prediction methods have to robustly take into account the available information relating to the vehicles present path and also to account for the un-predictable behavior of the other road users.

The two main machine learning paradigms for ADAS are end-to-end learning and modular system design. In end-to-end learning, one machine learning system will be used to control the vehicle by observing sensor data such as images from camera or data from a radar. In the modular system design, perception and control parts are isolated and the intermediate outputs from the perception are analyzed separately to get the required understanding of the environment which is then used in the decision and control modules to provide an input for the steering wheel and gas/brake pedals.

Although the above methods provide promising path prediction solutions for taking appropriate driving decisions, there is still appears to be room for improvement.

SUMMARY

In view of above, it is an object of the present invention to provide improved prediction accuracy for taking driving action decisions in advanced driver assist systems for vehicles and/or autonomous drive systems for vehicles.

According to a first aspect of the invention, there is provided a method for predicting a near future path for a vehicle to thereby provide an associated output control signal, the method comprising: collecting vehicle driving data indicative of at least the velocity and the yaw rate of the vehicle, collecting sensor data indicative of the presence of objects in the vicinity of the vehicle, collecting road data indicative of a roadway on the presently occupied road for the vehicle, receiving an input control signal indicative of an intended driving action for the vehicle, pre-process the sensor data and the vehicle driving data to provide a set of object data comprising a time series of previous positions of the respective object relative the vehicle, a time series of the previous headings of the objects, and time series of previous velocities of each of the objects relative the vehicle processing the object data, the road data, the control signal, the vehicle driving data, and the sensor data in a deep neural network to predict the near future path for the vehicle, based on the processing in the deep neural network, providing a predicted path output and an output control signal for executing a driving action according to the predicted path.

The present invention is based on the realization that the path prediction accuracy may be improved by pre-processing the sensor data relating to objects near the vehicle, and vehicle driving data relating to the present vehicle, to provide a suitable representation of object data comprising a time series of previous positions and velocities of each of the objects relative the vehicle. This representation of the set of object data is input into a deep neural network adapted for image interpretation to predict the near future path for the vehicle.

The present invention is further based on the realization that the inclusion of a control signal which indicates an intended driving action or a possible driving action in the deep neural network processing provides for more advanced decision taking. For example, the deep neural network may predict that a driving action may or should be taken in the near future, this prediction may be included in the output control signal and the output predicted path.

A driving action may for example be a lane change, taking a highway exit or entrance, which exit to take in a roundabout, overtaking another vehicle, etc.

The output predicted path may be provided in the form of polynomial coefficients of a curve fitted to the predicted path or just a down-sampled version of the predicted path. Similarly, input data can be down-sampled.

The object position with respect to the vehicle should be understood to mean the spatial location of the object with respect to the vehicle, i.e. such that the distance from the object to the vehicle can be determined and also in which direction (e.g. heading, bearing, or front, rear, left right) from the vehicle the object is located. The position of an object may for example be a coordinate in a coordinate system where the vehicle's coordinates are known. Furthermore, the object size may also be included in the object data. The object size is an indication of the space occupied by the object.

Vehicle driving data comprises at least data indicative of the velocity and the angular velocity (e.g. "yaw rate") of the vehicle. Vehicle driving data may further comprise data indicative of the acceleration, pitch rate, roll rate, etc., of the vehicle. A pitch motion of the vehicle is a rotation of the vehicle body around a transverse axis parallel with a side-to-side axis through the vehicle. A roll motion is a rotation of the vehicle around a longitudinal axis parallel with a front-to-rear axis through the vehicle.

In some possible implementations the deep neural network may be a multi-layer convolutional neural network comprising optional recurrent or recursive layers to improve the prediction accuracy of the path prediction. The deep neural network may also improve the consistency of the path prediction.

Pre-processing may include using machine learning or computer vision methods to identify the objects from the sensor data. Such machine learning methods or computer vision methods are per se known to the skilled person. Briefly, machine learning or computer vision methods and statistical signal processing are used to locate the objects in the vicinity of the vehicle and estimate their distance to the vehicle and also their speed. Outputs sensor data from different sensors can be fused by sensor fusions methods known to the skilled person to output the final object data.

The road data provides information about the roadway of the road. For example, sensor data may be analyzed to detect lane markings on the road, or to detect the road edges. Alternatively or additionally, road data may be provided from map information. Road edges and lane markings may primarily be detected by processing camera or lidar signals in the pre-processing step, or in a separate processing step using e.g. machine learning or computer vision methods and statistical signal processing, per se known to the skilled person.

The roadway may be a part of the road between lane markings or road edges of the road. The roadway is thus the part of the road on which it is suitable for the vehicle to drive.

The near future path should be interpreted as meaning the path during the near upcoming seconds for the vehicle. Thus, the predicted near future path includes the predicted path during the following e.g. 1, 2, 3, 4, or 5 seconds. A path should be understood as meaning any one of, or a combination of a longitudinal path, lateral path, and/or a height path.

The object data further comprises the heading (e.g. the "orientation") of the objects with respect to the vehicle. Additionally, the object data may further comprise the angular velocity ("yaw rate") of the objects with respect to the vehicle.

The set of object data may be provided by forming a matrix of the object data, the vehicle driving data, and the road data, as part of the pre-processing. The matrix comprises the time series of previous positions of the respective object relative the vehicle, the time series of the previous headings of the objects, and the time series of previous velocities of each of the objects relative the vehicle, wherein the matrix is processed in the deep neural network. Thus, the matrix comprises matrix elements forming lists of object data for a time series. Fore example, the matrix may be a 2-dimensional matrix of object data for one object. The matrix may thus comprise a time series of previous velocities with respect to the vehicle, a time series of previous positions with respect to the vehicle, and a time series of object headings. When there are several objects detected in the vicinity of the vehicle, one 2-dimensional matrix for each object may be provided or the object data for several objects may be included in a single 2-dimensional matrix, or a 3-dimensional matrix comprising the object data for more than one object may be provided.

Accordingly, the sensor data combined with the vehicle driving data may be restructured into a matrix where each column is a separate input and may according to some embodiments consist of the last e.g. 0-5 seconds of that input.

In some possible implementations, the representation of the set of object data may be provided by forming a graphical representation of the object data as part of the pre-processing, the graphical representation comprising a time series of images each indicative of a previous position of the respective object relative the vehicle, and a previous heading of the respective object, wherein the time series of images are processed in the deep neural network.

Data transformations may be used to transfer sensor data, vehicle driving data, and road data into a graphical representation of the scene comprising the vehicle and the surrounding objects. The graphical representation is advantageously insensitive to changes in object identification numbers. Further time series of previous positions and velocities of the objects are included into the graphical representation by different means. The time series may for example be included as a sequence of images, or the time series may be overlaid into a common graphical representation of the present scene and the scene history.

Further, a graphical representation based on the object data and the vehicle driving data may comprise an image indicative of a previous position of the respective object relative the vehicle, and a previous heading of the respective object, wherein the image is processed in the deep neural network. In other words, the previous positions and the previous headings may be overlaid with each other in a single image.

As an example, the object data and other scene data can be used to form a bird-eye view image of the surroundings that can be processed with the deep neural network to predict the vehicle path. Using a graphical representation advantageously enables the use of a convolutional neural network to predict the path.

Convolutional neural networks are particularly advantageous for analyzing images since spatial correlation is used effectively in convolutional neural networks and since the weights or connections between nodes are shared between connections from the input to the output nodes of a convolutional neural network. Therefore the number of required unknown parameters to be learnt by the deep neural network using given training data is fewer and it is therefore affordable to process high dimensional inputs such as images. In addition, recurrent neural network is employed in the inventive concept to provide the time aspect of the predicted path.

In some embodiments, pre-processing may comprise forming a graph based on the object data and the vehicle driving data, the graph comprising the previous object positions and a velocity profile, wherein the graph is processed in the deep neural network.

In some embodiments, it is included to collect map data indicative of a road environment and legal road characteristics, and processing the map data in the deep neural network to predict the near future path. The road environment may include the locations of the crossings, exits/entrances to the highways, number of lanes. Legal road characteristics may include speed limits and other road regulations. The legal road characteristics may be collected from a global positioning system or other means installed in the vehicle of establishing the position on the road and the legal road characteristics at that position.

It may be included to collect destination data indicative of an intended future destination for the vehicle, and to process the destination data in the deep neural network to predict the near future path. Destination data may be how the vehicle should be driven in a road environment. For example, when approaching a round-about, the preferred near future destination is a certain path in the round-about. Further, when approaching a highway exit, the preferred near future destination may be to a path off the highway, or a path to stay on the highway. A further example is that the destination data may be how to drive though a crossing, e.g. turn or go straight.

It may also be included in the method to collect traffic information indicative of deviations in the upcoming road resulting from intervention on the road, collecting position data indicative of the vehicle position, and processing the traffic information in the deep neural network to predict the near future path. Traffic information may relate to the precedence and location of accidents or construction works, etc. The vehicle position may be collected via a GPS. Traffic information may be collected via traffic information provider.

According to embodiments it may be further included to perform a safety check on the output control signal indicative of a driving action, wherein when the driving action is approved, process the output control signal together with updated object data and updated road data in the deep neural network to predict a further near future path, and based on the processing in the deep neural network, provide an updated predicted path output. Accordingly, to improve safety for occupants of the vehicle, other vehicles on the road, and e.g. pedestrians, the output control signal is checked against safety constraints to avoid accidents.

According to one possible embodiment, it may be included to perform a safety check on the predicted near future path, based on the outcome of the safety check, executing the predicted near future path. Accordingly, a predicted path may be suggested or executed by the vehicle (e.g. an autonomous vehicle) if the predicated near future path passes the safety check. For example, a lane change may be predicted and suggested, it the output control signal suggesting the lane change passes a safety check and the predicated path is approved, the lane change may be executed.

In the deep neural network, the sensor data may be passed through convolutional layers to provide low dimensional sensor data representations, and the object data and the road data may be passed through fully connected layers to provide low dimensional object data representations, and low dimensional road data representations.

Furthermore, in the deep neural network, the sensor data, the object data, and the road data may be passed through convolutional layers to provide respective low dimensional data representations.

In some embodiments, the low dimensional data representations may be processed through additional layers to predict the output near future path and the output control signals.

In the deep neural network, the object data, the vehicle driving data and the road data may be passed through fully connected layers to provide low dimensional object data representations, low dimensional vehicle driving data, and low dimensional road data representations. The low dimensional data representations may be processed though additional convolutional (or recursive or recurrent) layers to predict the near future path. A low dimensional representation of data is a representation of the data given by a reduced number of dimensions. For example, if the original data is given in a 1000-dimensional vector, the low dimensional representation of that data may be e.g. a 10-dimensional vector.

The deep neural network may be trained by supervised learning based on target values and paths recorded from human drivers in traffic or from automated drivers in traffic. The target values may be based on the paths taken by expert drivers, i.e. drivers driving the vehicle in paths which are considered at least close to optimal and therefore the target for the path prediction network in the deep neural network. During supervised training the deep neural network is trained by comparing the path taken by the vehicle based on the predicted paths with the target values. The training can be performed using for example backpropagation methods which are known per se to the skilled person. Pre-processing methods such as normalization and regularization techniques may be used to further improve the accuracy of the predicted path. Supervised learning may be understood as an imitation learning or behavioral cloning where the target values are taken from demonstrations of preferred behavior (i.e. driving paths in driving situations) and the deep neural network learns to behave as the demonstrations.

Further example types of a neural network may be generative and adversarial network. Generally, a generative adversarial network comprises a discriminator and a generator, both may be provided in the form of a neural network. The discriminator has to undergo training, i.e. unsupervised training based on training data. It is the discriminator that will perform the mapping of driving behavior data with a driver model once it has been trained. The discriminator may be operated by a vehicle control unit. The generator is configured to provide noise influenced data samples (i.e. "fake samples") from a latent space to the discriminator. The discriminator is trained to distinguish between the real samples (i.e. present driving behavior data) and the fake samples. During training it is checked whether the discriminator was correct in its determination, and the training is fine tuned based on the outcome of the discriminators decision. Optimization in the generative adversarial network may be towards an global expected reward.

According to embodiments of the invention, the deep neural network may be trained by un-supervised learning based on a definition of safe and natural driving. For the unsupervised learning, a reinforcement learning method may be implemented using a proposer definition of safe and natural driving. The definition may include lane placement, distance to other vehicles, smoothness of driver inputs such as steering angle, accelerator pedal input and brake input, and predicting and avoiding dangerous situations such as vehicle approaching intersections in too high speed. Generally, unsupervised learning is achieved by letting the deep neural network interact with the environment, in this case in a driving situation, where a reward function is provided in order to judge the suitability of decisions taken by the deep neural network.

The deep neural network may be further trained online by analyzing the target values and paths recorded during operation of the vehicle during normal use of the vehicle. Further, the online training may comprise to record corrective actions performed by a human driver to correct the actual path taken by the vehicle. Accordingly, processing circuitry may be available to collect and store sensor data and possibly process it on-board or send the sensor data to a remote server (i.e. to the "Cloud") for processing by a deep neural network which has learned from data collected from a plurality of vehicles connected to the server.

The time series of data in the matrix may include position data and velocity data from the previous 0 to 1 second, 0 to 2 seconds, 0 to 3 seconds, 0 to 4 seconds, or 0 to 5 seconds.

According to a second aspect of the invention, there is provided a system for predicting a near future path for a vehicle to thereby provide an associated output control signal, the system comprises: an out-looking sensor unit for obtaining sensor data indicative of the presence of objects in the vicinity of the vehicle, and for capturing road data indicative of a roadway on the presently occupied road for the vehicle, a vehicle sensor unit for collecting vehicle driving data indicative of at least the velocity and the yaw rate of the vehicle, a safety control module for providing a control signal indicative of an intended driving action for the vehicle, and processing circuitry configured to: pre-process the sensor data and the vehicle driving data to provide a set of object data comprising a time series of previous positions of the respective object relative the vehicle, a time series of the previous headings of the objects, and time series of previous velocities of each of the objects relative the vehicle, process the object data, the road data, the vehicle driving data, the control signal, and the sensor data in a deep neural network to predict the near future path for the vehicle, and based on the processing in the deep neural network, providing a predicted path output and an output control signal for executing a driving action according to the predicted path.

The out-looking sensor unit comprises an image capturing device, a radar, a lidar, an ultrasonic sensor, or a combination thereof. The out-looking sensing unit may be configured to capture sensor data indicative of objects present in the vicinity of the object in any direction from the vehicle.

According to embodiments of the invention, the system may comprise a map unit configured to provide map data indicative of a road environment and legal present road characteristics, wherein the map data is used by the processing circuitry in the deep neural network to predict the near future path for the vehicle.

The system may further comprise a strategic path planning unit for providing destination data for the vehicle and a desired driving behavior in the road environments.

According to embodiments, the system may comprise a safety module configured to receive the output control signal and perform safety check of the indicated driving action, wherein if the intended driving action is approved by the safety module, the safety module is configured to provide the output control signal to the processing circuitry for further processing.

The processing circuitry may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device.

The system may be comprised in a vehicle.

This second aspect of the invention provides similar advantages as discussed above in relation to the previous aspect of the invention.

According to a third aspect of the invention there is provided a computer program product comprising a computer readable medium having stored thereon computer program means for predicting a near future path for a vehicle to thereby provide an associated output control signal, wherein the computer program product comprises: code for collecting vehicle driving data indicative of at least the velocity and the yaw rate of the vehicle, code for collecting sensor data indicative of the presence of objects in the vicinity of the vehicle, code for collecting road data indicative of a roadway on the presently occupied road for the vehicle, code for receiving an input control signal indicative of an intended driving action for the vehicle, code for pre-processing the sensor data and the vehicle driving data to provide a set of object data comprising a time series of previous positions of the respective object relative the vehicle, a time series of the previous headings of the objects, and time series of previous velocities of each of the objects relative the vehicle, and code for, processing the object data, the road data, the vehicle driving data, the control signal, and the sensor data in a deep neural network to predict the near future path for the vehicle, and for providing an output control signal.

This third aspect of the invention provides similar advantages as discussed above in relation to the above mentioned aspects of the invention.

In summary, the present invention relates to a method and a system for predicting a near future path and an associated output control signal for a vehicle. For the prediction sensor data, vehicle driving data, and road data are collected. An input control signal indicative of an intended driving action is received. The sensor data and the vehicle driving data is pre-processed to provide a set of object data comprising a time series of previous positions of the respective object relative the vehicle, a time series of the previous headings of the objects, and time series of previous velocities of the objects. The object data, the road data, the vehicle driving data, the control signal, and the sensor data is processed in a deep neural network. Based on the processing in the deep neural network, a predicted path output and an output control signal is provided.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein:

FIG. 3a conceptually shows a graphical representation;

FIG. 5b schematically provides an further example deep neural network;

DETAILED DESCRIPTION OF EXAMPLE EMBODIMENTS

Figure 1:
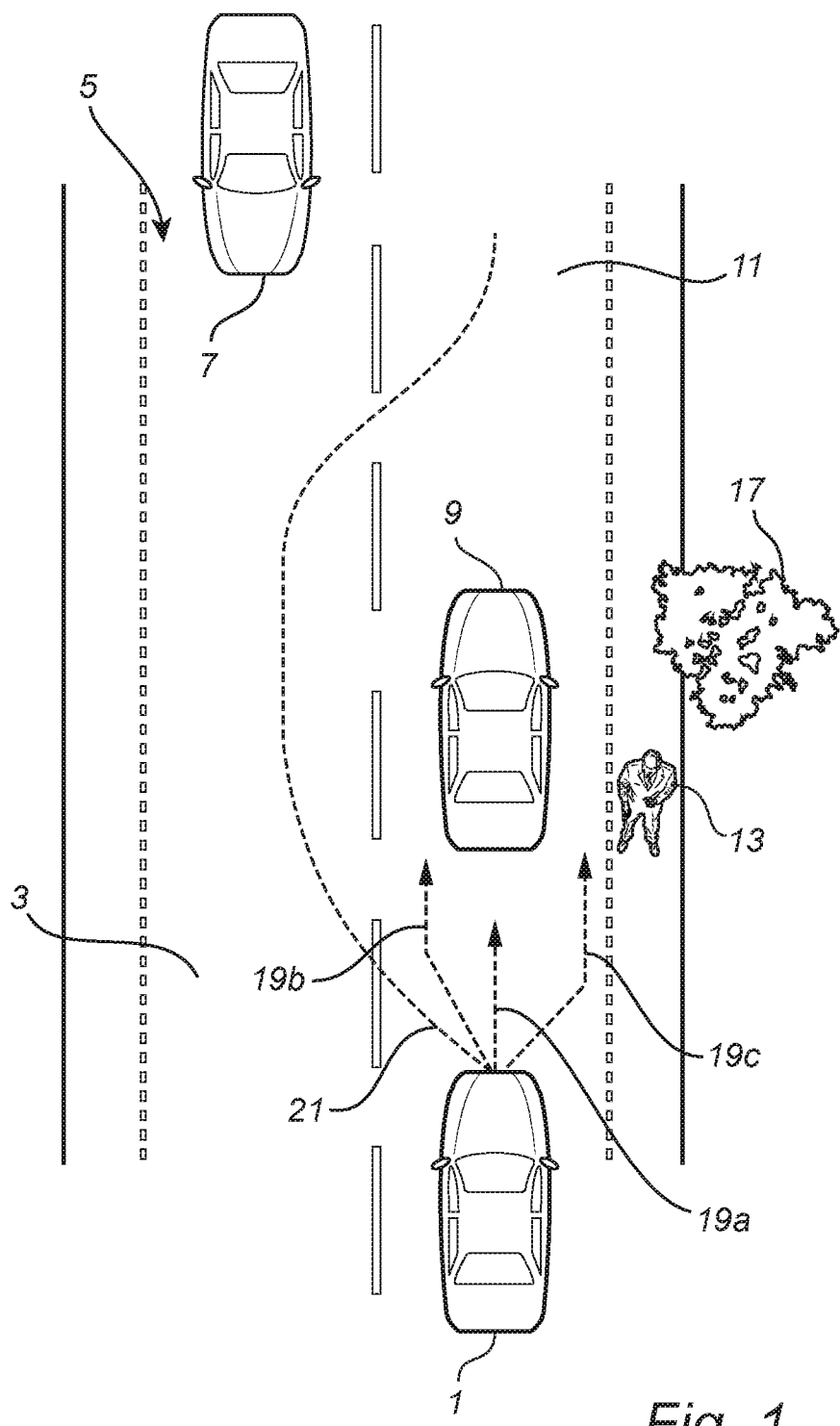
FIG. 1 conceptually illustrates application of embodiments of the invention.

In the present detailed description, various embodiments of the system and method according to the present invention are mainly described with reference to a vehicle in the form of a car. However, the present invention may equally be used with other vehicles such as trucks, buses, etc. Thus, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 conceptually illustrates an overview of the invention. FIG. 1 shows a vehicle 1 driving on a road 3. The vehicle 1 may have installed sensors (not shown) such as a radar, a lidar, an ultrasonic sensor, and/or an image capturing device for obtaining sensor data indicative of the presence of object in the vicinity of the vehicle 1. The object may for example be an oncoming vehicle 7 approaching the present vehicle 1 on the opposite lane 5, a vehicle 9 driving in front of the vehicle 1 in the same lane 11, a pedestrian 13 walking on a side walk 15 next to the road 3, or a tree 17 next to the road 3, to mention a few exemplary possible objects.

As the vehicle 1 is driving down the road 3 in this present driving situation, the sensors collect sensor data indicative of the presence of the objects 7, 9, 13, 17. The sensor data may be images from an image capturing device, e.g. a camera, or sensor data from a radar or Lidar or an ultra sonic sensor.

The vehicle 1 is further equipped with a vehicle sensor unit (not shown) comprising at least one of a gyroscope, an accelerometer, a speedometer, a steering torque sensor, etc. The vehicle sensor unit provides vehicle driving data indicative of the acceleration, pitch rate, roll rate, etc., of the vehicle 1. The vehicle driving data provides information about the motion of the vehicle whereas the sensor data provides information about the motions and positions of the surrounding objects. Together, the sensor data and the vehicle driving data enable an accurate understanding of the relationship between the vehicle and the surrounding objects.

The sensor data and the vehicle driving data is preprocessed in the vehicle 1 in order to obtain object data in the form of a list or a graphical representation of the surrounding objects 5, 9, 13, 17, and their statues. The preprocessing may include applying machine learning algorithms or computer vision methods to the sensor data for recognizing the objects and determining their statuses.

The list of object data for each of the surrounding objects 5, 9, 13, 17 comprises a time series of previous positions and previous velocities for each of the objects 5, 9, 13, 17 relative the vehicle 1. The object data further include the heading of the objects 5, 9, 13, 17 with respect to the vehicle 1 and in some possible implementations the angular rotation rate of the objects 5, 9, 13, 17 with respect to the vehicle 1. The time series may for example comprise positions, headings, and velocities from the previous 5 seconds with a resolution of e.g. 0.25 seconds.

Furthermore, the vehicle comprises a safety control module configured to provide a control signal indicative of an intended driving action for the vehicle. The intended driving action may for example be a lane change or taking a highway exit.

In this exemplary present driving situation for the vehicle 1, the vehicle 1 is driving faster than the vehicle 9. There is further a vehicle 7 driving on the opposite lane and approaching the vehicle 1 in an opposite direction compared to vehicle 1 and vehicle 9. The vehicle 1 is approaching the vehicle 9 from behind.

Based on processing the object data, the road data, the vehicle driving data, the control signal, and the sensor data in a deep neural network, a plurality of near future paths 19a-c, 21 may be predicted and an output control signal. The output control signal may suggest path 21, in other words to overtake the vehicle 9. The output control signal may be passed through a safety check before the vehicle 1 is allowed to execute the suggest path 21.

Herein is only three predicted near future paths shown for clarity. In accordance with the inventive concept described herein, there may be a vast number of predicted near future paths such as tens, hundreds, thousands or even more predicted near future paths associated.

Figure 2:
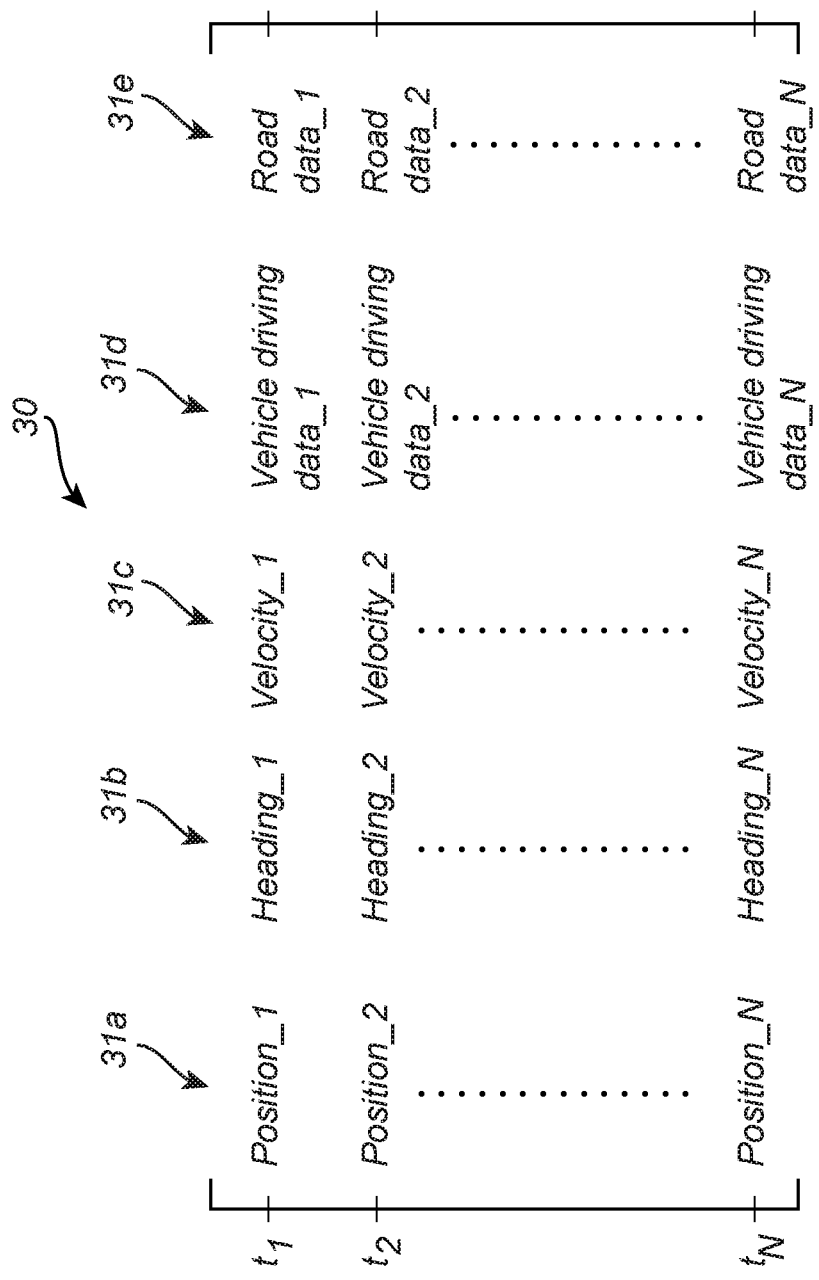
FIG. 2 conceptually shows a matrix of object data, vehicle driving data, and road data.

A conceptual view of a matrix 30 comprising lists 31a-c of object data is shown in FIG. 2. The list 31a (i.e. a column in the matrix) comprises the previous positions of the object for a time series $t_1$-$t_N$. The list 31b comprises the previous headings of the object for the time series $t_1$-$t_N$. The list 31c (i.e. a column in the matrix) comprises the previous velocities of the object for the time series $t_1$-$t_N$. The list 31d comprises previous vehicle driving data, and the list 31e comprises previous road data. The previous positions of the objects 5, 9, 13, 17 are schematically represented by the dashed lines in FIG. 1. The matrices, one for each of the objects 5, 9, 13, 17 are input into a deep neural network for predicting the near future path for the vehicle 1. The near future path may be the immediate future 0-5 seconds. In some implementations a single 2-dimensional matrix comprises the object data for all the identified objects. In further possible implementations the object data is included in a 3-dimensional matrix, i.e. as a stack of 2-dimensional matrices, one for each object.

FIG. 3a conceptually illustrates a representation of object data in the form of a graphical representation comprising a series of bird's eye views 300a-c of the vehicle 1 and the objects 5, 9, 13, 17. The bird's eye views thus together provide the time series of object locations and object velocities with respect to the vehicle 1. Also the object headings are provided by the graphical representations 300a-c. Using a graphical representation advantageously enables the use of a convolutional deep neural network in the prediction of the path. In some implementations using the series of bird's eye views 300a-c, a recurrent neural network may be used together with a convolutional deep neural network to improve the accuracy of the predicted path further.

In the first bird's eye view representation 300a collected sensor data has been pre-processed to provide an image (i.e. matrix of data) at a first instance in time. A second bird's eye view representation 300b is provided at a second time instance in the time series and a third bird's eye view representation 300c is provided at a third time instance in the time series. Thus, the series of graphical representations provides the time series of object data. The bird's eye views 300a-c are processed by a convolutional deep neural network to predict the near future path for the vehicle 1. Note that the time series of graphical representations is here only conceptually illustrated as comprising three bird eye views 300a-c.

In an implementation, a relatively high number of bird eye views are needed and are more bird eye views are continuously created and provided to the deep neural network for continuous path prediction. Using graphical representations enables improved usage of image processing techniques such as convolutional deep neural networks for predicting the near future path.

Figure 3B:
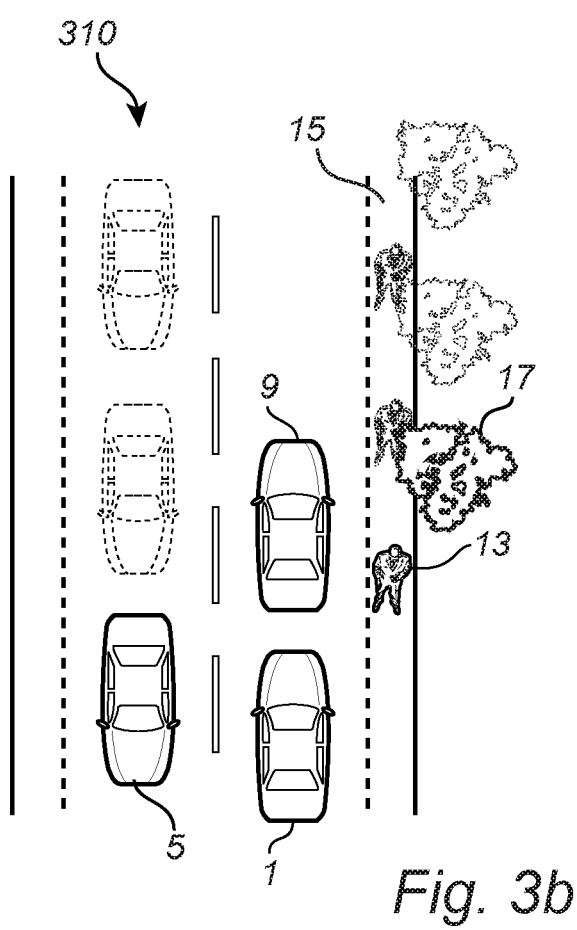
FIG. 3b conceptually shows a graphical representation.

FIG. 3b conceptually illustrates a representation of object data in the form of a graphical representation comprising a single image 310 based on object data and vehicle driving data. In the image 310, the previous positions and previous heading of the objects 5, 9, 13, 17 are indicated by dashed representations of the objects 5, 9, 13, 17. The single image 310 may also be provided as a bird's eye view. FIG. 3b only shows three time steps of previous positions and headings, however, the number of steps is only for exemplary purposes and in a real implementation, a relatively high number of time steps are used (e.g. hundreds or even thousands depending on the time resolutions).

Using a graphical representation which includes history data as shown in FIG. 3b advantageously enables the use of a convolutional deep neural network in the prediction of the path.

Figure 4:
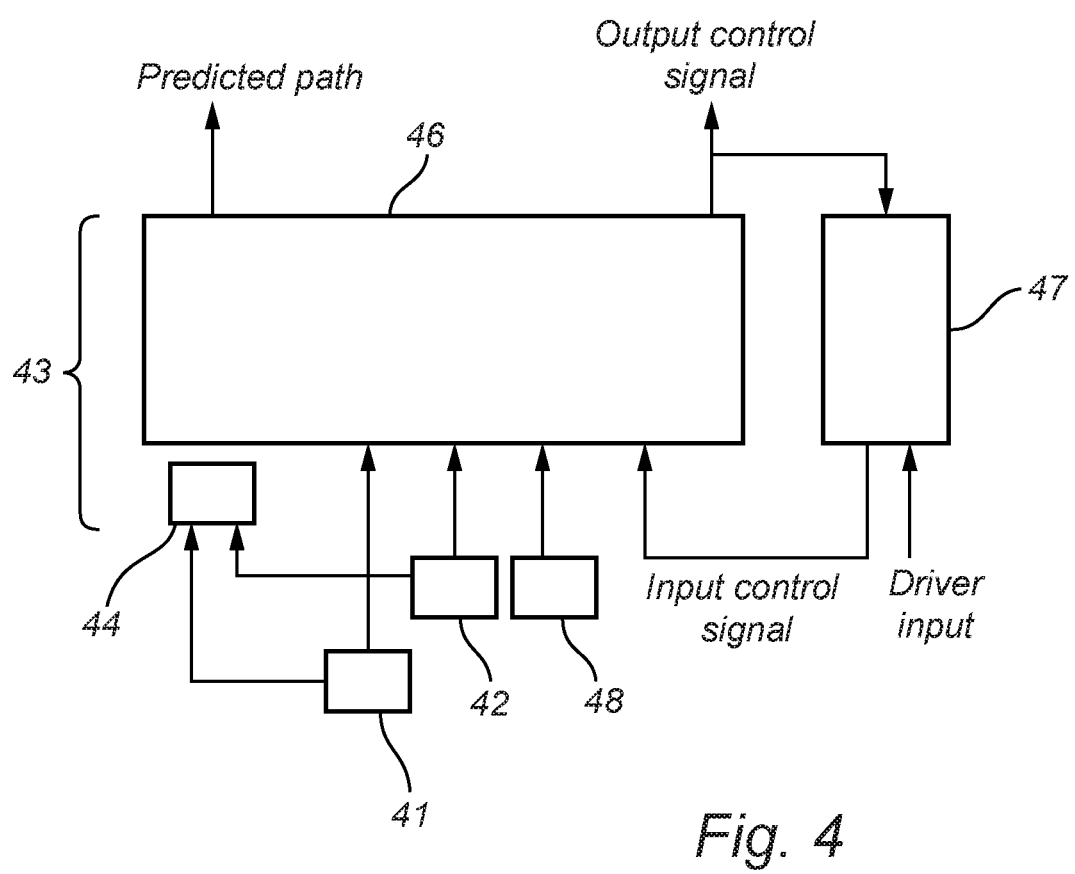
FIG. 4 schematically illustrates a system according to embodiments of the invention.

FIG. 4 conceptually illustrates a system 40 for predicting a near future path for a vehicle according to example embodiments of the invention. The system 40 comprises an out-looking sensor 41 comprising at least one of an image capturing device, a radar, or a Lidar, for obtaining sensor data indicative of the presence of objects in the vicinity of the vehicle. The sensor data from the sensor(s) 41 also include road data indicative of the roadway of the road where the vehicle is presently driving. The road information data may include the positions of road edges and lane markings with respect to the vehicle for determining the roadway.

Moreover, a vehicle sensor unit 42 is comprised in the system 40 and is configured to collect vehicle driving data indicative of at least the vehicle velocity and the vehicle yaw rate. A vehicle sensor unit 42 may comprise at least one of a gyroscope, an accelerometer, a speedometer, a steering torque sensor, etc. The vehicle sensor unit provides data indicative of the acceleration, pitch rate, roll rate, etc., of the vehicle.

The sensor data, the vehicle driving data, and the road data is input to processing circuitry 43 which may comprise a pre-processing module 44 and a processing module 46. The pre-processing module 44 may comprise software components for processing the sensor data and the vehicle driving data. In the pre-processing module 44, the sensor data and the vehicle driving data is used by e.g. computer vision methods or machine learning algorithms for obtaining object data for each of the identified objects. The object data comprise previous positions, previous headings, and previous velocities for the respective object for the previous e.g. 0-5 seconds. As new sensor data, vehicle driving data, and road data is collected, updated object data is generated. The object data may be provided in the form of one or more matrices or as a graphical representation comprising a series of images each indicative of a previous position of the respective object relative the vehicle, and a previous heading of the respective object.

Furthermore, the system comprises a safety control module 47 for providing an input control signal indicative of an intended driving action for the vehicle. The input control signal may originate from a driver input of a suggested driving action, the driver input may be from a human driver or from an autonomous driving system. The safety control module 47 provides the control signal to the processing module 46 such that the control signal is also processed in the deep neural network. The control signal may also be an in indication of an intended driving action suggested by the safety control module.

The matrices of object data or the graphical representation of the object data, the raw sensor data, the input control signal, and the road data are input into the processing module 46 of the processing circuitry 43. The processing module 46 may comprise software components for processing the data in a deep neural network for predicting the near future path for the vehicle based on input data.

With further reference to FIG. 4, additional input to the deep neural network operated by the processing module 46 may include map information or destination data which may be input from a navigation system 48 such as one including a global position system and input from the driver regarding the destination. The map information provides additional information for the deep neural network such as the location of crossings, exist/entrances to the highways, speed limits, number of lanes, etc.

The output from the processing in the deep neural network comprises a predicted near future path and an output control signal. The output control signal may comprise instructions for executing a driving action related to at least one predicted near future path.

Optionally, the output control signal is input to the safety control module 47 for performing a safety check of the driving action. The safety check may be related to limiting the steering angle and steering force for the vehicle such that the vehicle is not thrown off the road, limiting the maximum acceleration and movement in both the lateral and the longitudinal direction. If the intended driving action is approved by the safety control module 47, the safety control module is configured to provide the output control signal to the processing module 46 for determining an updated predicted near future path with the approved output control signal as the input control signal to the deep neural network.

Figure 5A:
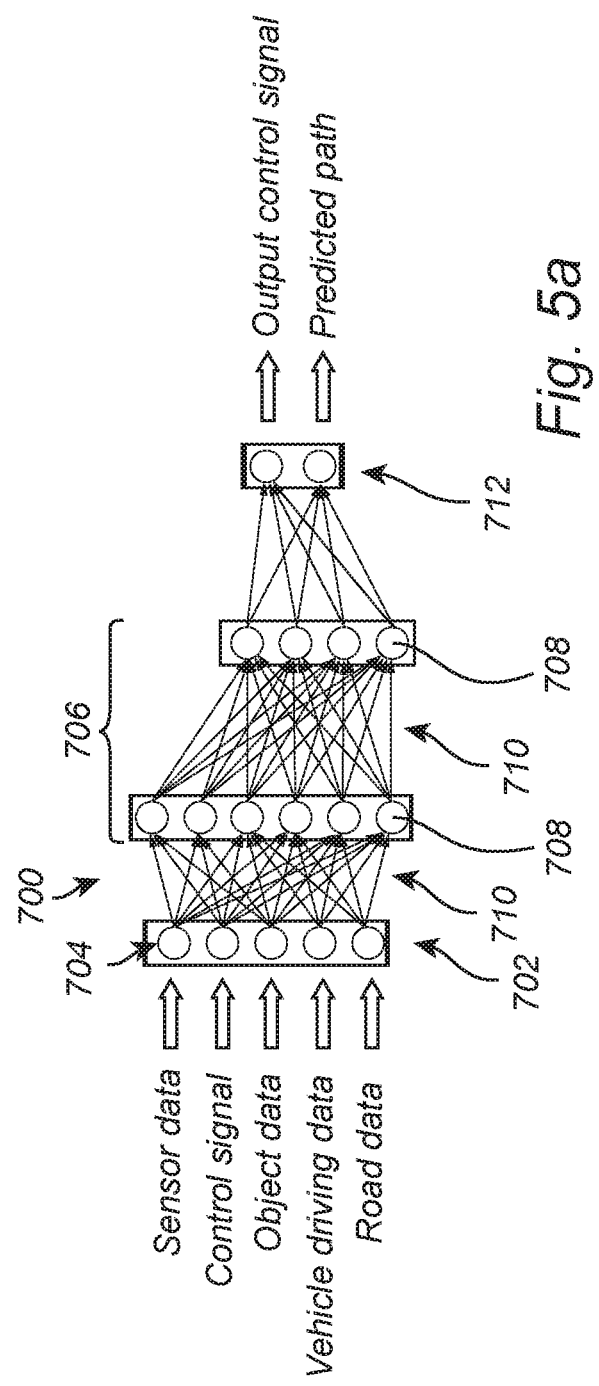
FIG. 5a schematically illustrates a methodology for determining a near future path.

FIG. 5a illustrates a possible approach of implementing a deep neural network for predicting a near future path and an output control signal. FIG. 5a specifically illustrates a block diagram of a feed forward deep neural network 700 used for predicting a near future path and the output control signal for a vehicle. The near future path may be predicted continuously or periodically during operation of the vehicle depending on the specific application.

The block diagram comprises an input layer 702, configured to receive input data to the deep neural network. The input data includes vehicle driving data, road data, sensor data, a control signal, and object data. The object data, the vehicle driving data, and the road data may be provided as matrix of data, a graphical representation (e.g. series of images, or as a single bird's eye view with overlapping historical data), or as a graph. The object data includes a time series of previous positions of the respective object relative the vehicle, a time series of the previous headings of the objects, and time series of previous velocities of each of the objects relative the vehicle. In other words, the object data includes historical data (in the past e.g. 1, 2, 3, 4, 5 seconds) for the objects. As mentioned, the object data is determined from pre-processing sensor data and the vehicle driving data. The input layer includes nodes 704 associated with each of the inputs.

The deep neural network 700 also includes one or more convolutional layers, and optional recurrent or recursive layers in block 706. A deep neural network based on recurrent layers take current data from the input layer 702 as an input in addition to previously processed data. In other words, recurrent layers are advantageously used for capturing the history of the input data.

Nodes 704 of the input layer 702 communicate with the nodes 708 of the layers 706 via connections 710. The connections 710 and weights of the connections are determined during training sessions, e.g. supervised or unsupervised training.

A predicated path and an output control signal is output in the output layer 712. The output predicted path may be provided in the form of polynomial coefficients of a curve fitted to the predicted path or just a down-sampled version of the predicted path.

It should be noted that the number of connections and nodes for each layer may vary, FIG. 5a is only provided as an example. Accordingly, in some deep neural network designs more than the indicated layers in FIG. 5a may be used.

FIG. 5b conceptually illustrates a convolutional neural network in line for possible use with the inventive concept. In a convolutional neural network, as is known per se to the skilled person, convolutions of the input layer are used to compute the output. Local connections are formed such that each part of the input layer is connected to a node in the output. Each layer applies filters whereby the parameters of the filters are learned during training phases for the neural network.

The deep neural network may be trained based on supervised learning based on target values and paths recorded from human or automated drivers in traffic. Alternatively, the deep neural network is trained by un-supervised learning based on a definition of safe and natural driving.

Figure 6:
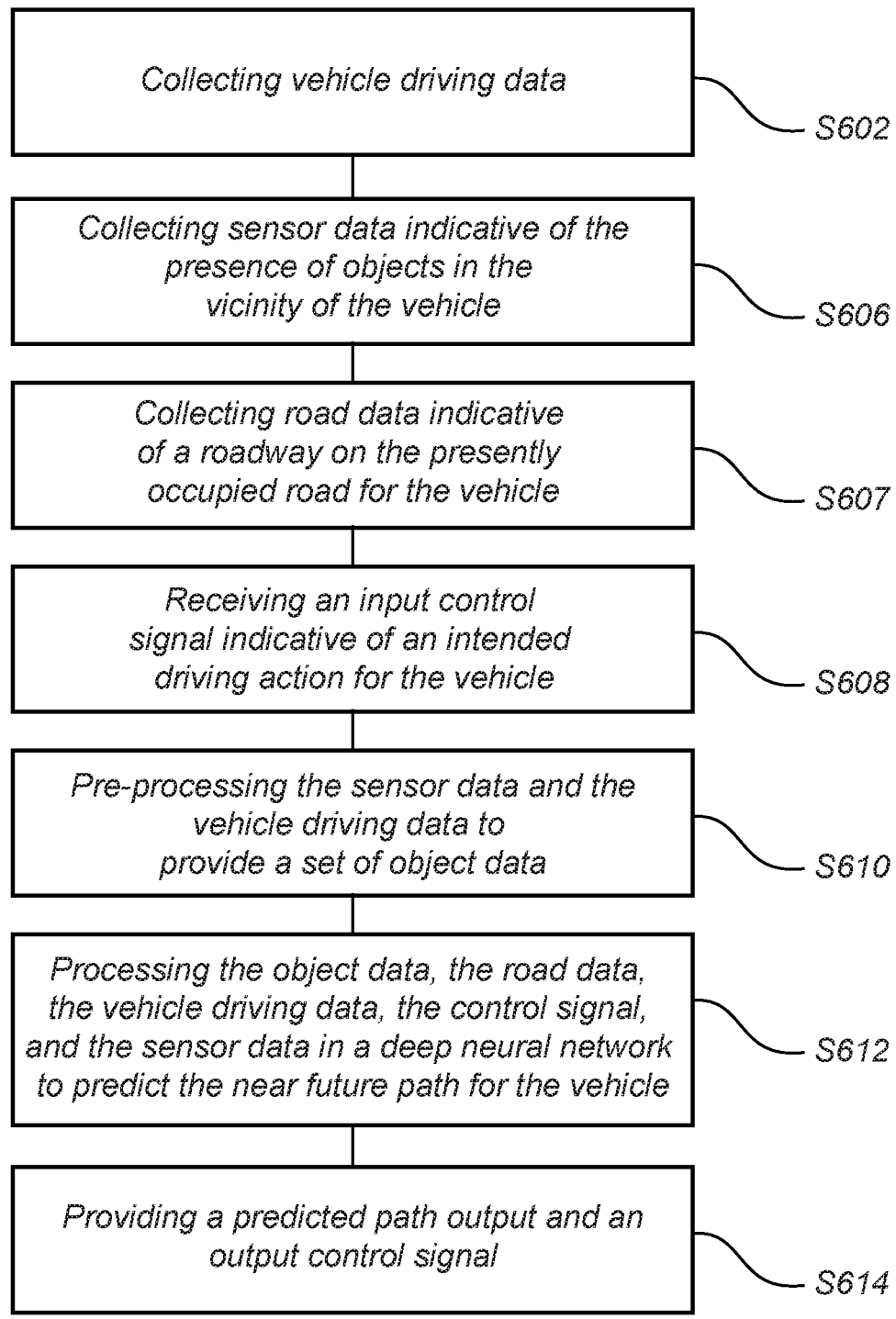
FIG. 6 is a flowchart of method steps according to embodiments of the invention.

FIG. 6 is a flowchart of steps according to embodiments of the inventive concept. In step S602 is vehicle driving data collected indicative of at least the velocity and the yaw rate of the vehicle. Further, in step S606 is sensor data collected indicative of the presence of objects in the vicinity of the vehicle. Further data that is collected S607 comprises road data indicative of a roadway on the presently occupied road for the vehicle. An input control signal is received in step S608 and is indicative of an intended driving action for the vehicle. The sensor data and the vehicle driving data is pre-processed in step S610 to provide a set of object data comprising a time series of previous positions of the respective object relative the vehicle, a time series of the previous headings of the objects, and time series of previous velocities of each of the objects relative the vehicle. Next, in step S612, the object data, the road data, the vehicle driving data, the control signal, and the sensor data is processed in a deep neural network to predict the near future path for the vehicle. Finally, a predicted path output and an output control signal are provided based on the processing in the deep neural network.

Figure 7:
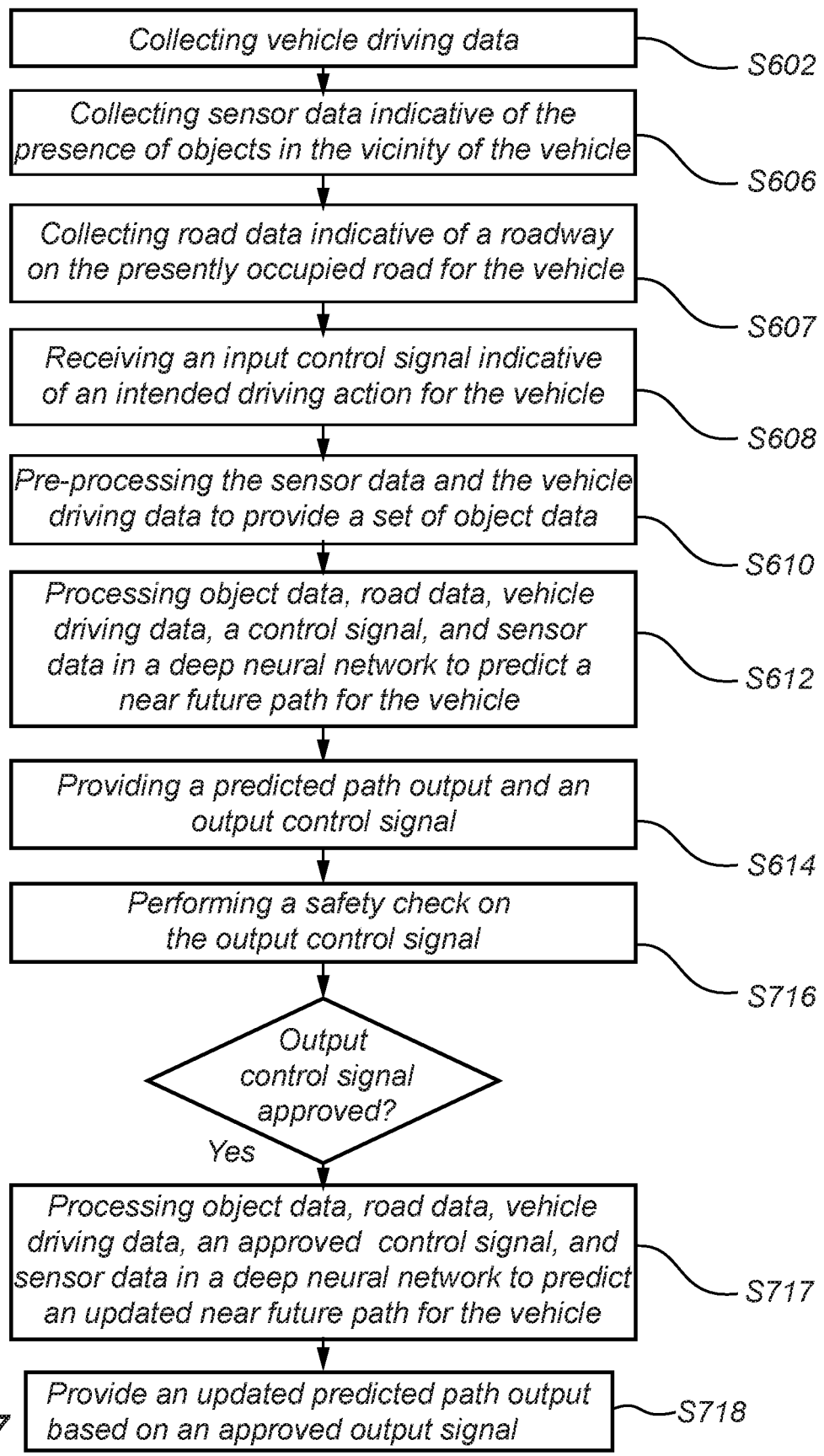
FIG. 7 is a flowchart of method steps according to embodiments of the invention.

FIG. 7 illustrates a flow-chart of method steps according to a further embodiment. In addition to the steps described with reference to FIG. 6, there is in FIG. 5 provided an additional step S716 of performing a safety check on the output control signal indicative of a driving action. If the driving action is approved the output control signal is input a further processing step S717 in order to provide S718 an updated predicted path output based on the approved output control signal for executing the associated driving action. If the output control signal is not approved, the process may for example start over from step S602.

Figure 8:
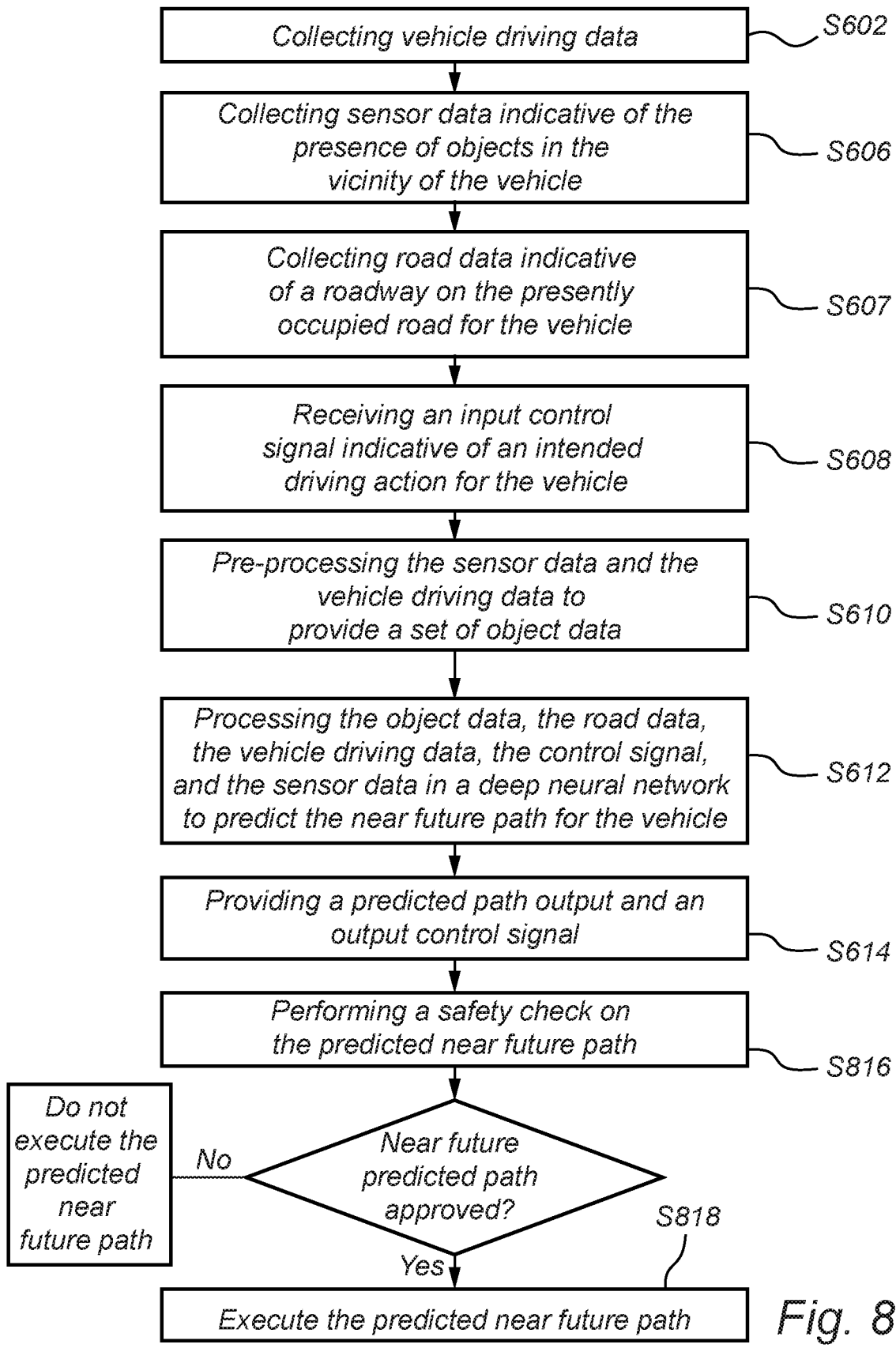
FIG. 8 is a flowchart of method steps according to embodiments of the invention.

FIG. 8 illustrates a flow-chart of method steps according to a further embodiment. In addition to the steps described with reference to FIG. 6, there is in FIG. 8 included a step S816 of performing a safety check on the predicted near future path. If the path is approved, the path is executed in step S818, if the path is not approved, the predicted near future path is not executed. The safety check of the near future path in FIG. 8 may be combined with the safety check of the output control signal shown in FIG. 7.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for predicting a near future path for a vehicle to thereby provide an associated output control signal, the method comprising:
    collecting vehicle driving data indicative of at least a velocity and a yaw rate of the vehicle,
    collecting sensor data indicative of the presence of objects in a vicinity of the vehicle,
    collecting road data indicative of a roadway on a presently occupied road for the vehicle,
    receiving an input control signal indicative of an intended driving action for the vehicle,
    pre-processing the sensor data and the vehicle driving data to provide a set of object data comprising a time series of previous positions of a respective object relative to the vehicle, a time series of the previous headings of the object, and a time series of previous velocities of the object relative the vehicle,
    processing the object data, the road data, the vehicle driving data, the control signal, and the sensor data in a deep neural network to predict the near future path for the vehicle,
    based on the processing in the deep neural network, providing a predicted path output and an output control signal for executing a driving action according to the predicted path.

2. The method according to claim 1, further comprising:
    collecting map data indicative of a road environment and legal road characteristics,
    processing the map data in the deep neural network to predict the near future path.

3. The method according to claim 1, further comprising:
    performing a safety check on the output control signal indicative of a driving action,
    when the driving action is approved, processing the output control signal together with updated object data and updated road data in the deep neural network to predict a further near future path,
    based on the processing in the deep neural network, providing an updated predicted path output.

4. The method according to claim 1, further comprising:
    performing a safety check on the predicted near future path,
    based on the outcome of the safety check, executing the predicted near future path.

5. The method according to claim 1, wherein in the deep neural network, the sensor data is passed through convolutional layers to provide low dimensional sensor data representations,
    the object data and the road data is passed through fully connected layers to provide low dimensional object data representations and low dimensional road data representations.

6. The method according to claim 1, wherein in the deep neural network, the sensor data, the object data, and the road data are passed through convolutional layers to provide respective low dimensional data representations.

7. The method according to claim 5, wherein the low dimensional data representations are processed through additional layers to predict the output near future path and the output control signals.

8. The method according to claim 1, wherein the deep neural network is trained by supervised learning based on target values and paths recorded from human drivers in traffic.

9. The method according to claim 1, wherein the deep neural network is trained by un-supervised learning based on a definition of safe and natural driving.

10. The method according to claim 1, wherein the time series includes position data and velocity data from the previous 0 to 1 second, 0 to 2 seconds, 0 to 3 seconds, 0 to 4 seconds, or 0 to 5 seconds.

11. A system for predicting a near future path for a vehicle to thereby provide an associated output control signal, the system comprising:
- an out-looking sensor unit for obtaining sensor data indicative of the presence of objects in a vicinity of the vehicle and for capturing road data indicative of a roadway on a presently occupied road for the vehicle,
- a vehicle sensor unit for collecting vehicle driving data indicative of at least a velocity and a yaw rate of the vehicle,
- a safety control module for providing a control signal indicative of an intended driving action for the vehicle, and
- processing circuitry configured to:
  - pre-process the sensor data and the vehicle driving data to provide a set of object data comprising a time series of previous positions of a respective object relative the vehicle, a time series of previous headings of the object, and a time series of previous velocities of the object relative the vehicle,
  - process the object data, the road data, the vehicle driving data, the control signal, and the sensor data in a deep neural network to predict the near future path for the vehicle,
  - based on the processing in the deep neural network, provide a predicted path output and an output control signal for executing a driving action according to the predicted path.

12. The system according to claim 11, wherein the out-looking sensor unit comprises an image capturing device, a radar, a lidar, or a combination thereof.

13. The system according to claim 11, further comprising:
- a map unit configured to provide map data indicative of a road environment and legal present road characteristics, wherein the map data is used by the processing circuitry in the deep neural network to predict the near future path for the vehicle.

14. The system according to claim 11, wherein the safety control module is configured to receive the output control signal and perform safety check of the indicated driving action,
wherein if the intended driving action is approved by the safety control module, the safety control module is configured to provide the output control signal to the processing circuitry to provide an updated predicted path output.

* * * * *